United States Patent
Okada et al.

(10) Patent No.: US 11,635,067 B2
(45) Date of Patent: Apr. 25, 2023

(54) ELECTRIC COMPRESSOR

(71) Applicant: KABUSHIKI KAISHA TOYOTA JIDOSHOKKI, Kariya (JP)

(72) Inventors: Satoshi Okada, Aichi-ken (JP); Yoshifumi Tada, Aichi-ken (JP); Yusuke Kinoshita, Aichi-ken (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 249 days.

(21) Appl. No.: 16/953,658

(22) Filed: Nov. 20, 2020

(65) Prior Publication Data
US 2021/0164459 A1    Jun. 3, 2021

(30) Foreign Application Priority Data
Nov. 28, 2019    (JP) .................. 2019-215191

(51) Int. Cl.
  *F04B 35/04*    (2006.01)
  *H02K 11/33*    (2016.01)
  (Continued)

(52) U.S. Cl.
  CPC .............. *F04B 35/04* (2013.01); *F04B 39/06* (2013.01); *F04B 39/121* (2013.01); *H02K 5/225* (2013.01);
  (Continued)

(58) Field of Classification Search
  CPC ........ F04B 35/04; F04B 39/06; F04B 39/121; F04B 2203/0201; H02M 7/003;
  (Continued)

(56) References Cited

U.S. PATENT DOCUMENTS

| 2014/0140119 A1* | 5/2014 | Shinohara | H02M 7/003 363/141 |
| 2015/0061558 A1* | 3/2015 | Yano | F01C 21/10 318/400.26 |

(Continued)

FOREIGN PATENT DOCUMENTS

| EP | 2736160 A1 | 5/2014 |
| JP | 2017-175807 A | 9/2017 |
| JP | 2017175807 A * | 9/2017 ............. F04B 35/04 |

OTHER PUBLICATIONS

Extended European Search Report dated Mar. 24, 2021 from the European Patent Office in EP Application No. 20207097.5.

*Primary Examiner* — Devon C Kramer
*Assistant Examiner* — Joseph S. Herrmann
(74) *Attorney, Agent, or Firm* — Sughrue Mion, PLLC (57) ABSTRACT

An electric compressor includes an electric motor, and a motor controller configured to drive the electric motor. The motor controller includes a high voltage circuit board on which switching elements are mounted, a low voltage circuit board on which a control circuit controlling switching operation of the switching elements is mounted, an input connector, an output connector, and a current sensor. The high voltage circuit board and the low voltage circuit board are stacked with each other. The output connector is integrated with a detection busbar that provides electrical connection between the high voltage circuit board and the low voltage circuit board, and through which detection signals indicative of the output current are output to the control circuit.

2 Claims, 5 Drawing Sheets (51) Int. Cl.
*F04B 39/06* (2006.01)
*F04B 39/12* (2006.01)
*H02K 5/22* (2006.01)
*H02M 7/00* (2006.01)

(52) U.S. Cl.
CPC ............ *H02K 11/33* (2016.01); *H02M 7/003* (2013.01); *F04B 2203/0201* (2013.01)

(58) Field of Classification Search
CPC ............ F04C 29/0085; F04C 2240/803; F04C 2240/808; F04C 2240/81; F04C 2270/075
See application file for complete search history.

(56) References Cited

U.S. PATENT DOCUMENTS

2015/0288258 A1\* 10/2015 Hattori .................. H02K 11/33
                                                                         310/68 D
2016/0281716 A1\* 9/2016 Kawamura ........... F04C 23/008
2019/0393800 A1\* 12/2019 Suzuki ................. H05K 5/0026

\* cited by examiner

ELECTRIC COMPRESSOR

CROSS-REFERENCE TO RELATED APPLICATION

This application claims priority to Japanese Patent Application No. 2019-215191 filed on Nov. 28, 2019, the entire disclosure of which is incorporated herein by reference.

BACKGROUND ART

The present disclosure relates to an electric compressor.

An electric compressor generally includes an electric motor and a motor controller that drives the electric motor. For example, Japanese Patent Application Publication No. 2017-175807 discloses an electric compressor that includes a high voltage circuit board (high heat dissipation circuit board) on which switching elements are mounted and a low voltage circuit board (control circuit board) on which a control circuit for controlling switching operation of the switching elements is mounted. The high voltage circuit board and the low voltage circuit board are stacked with each other.

A motor controller of the electric compressor in the Publication has an input connector that provides electrical connection between the high voltage circuit board and the low voltage circuit board. Control signals from the control circuit are input into the switching elements through the input connector. The motor controller sometimes further includes an output connector which is electrically connected to the high voltage circuit board and through which the output current is output to the electric motor.

Current from an external power source flows in the high voltage circuit board, and is output to the electric motor through the output connector as the output current, by which the electric motor is driven. The high voltage circuit board has thereon current sensors that detect the output current to the electric motor. The control circuit controls the switching operation of the switching elements in such a manner that the output current detected by the current sensors reaches a required current.

The input connector and a detection connector through which detection signals indicative of the output current detected by the current sensors are output to the control circuit are electrically connected to the switching elements, and located in separate positions. In particular, since the current sensors need to be disposed in a current path between the switching elements and the output connector, the input connector and the detection connector mounted on a printed circuit board are generally located in the separate positions. This increases a size of the motor controller. On the other hand, a structure in which the input connector and the detection connector are integrated with each other may also be considered. However, in this structure, a length of a trace between the switching elements and either the input connector or the detection connector is longer. This causes a fear that the detection signals are affected by noise from the switching elements by the extended length of the trace. In particular, when a trace on the high voltage circuit board crosses the current path formed on the high voltage circuit board, the detection signals are especially affected by the noise to a great extent.

The present disclosure has been made in view of the above circumstances and is directed to providing an electric compressor that restrains a size from being increased, and noise of current flowing in a high voltage circuit board from affecting detection signals indicative of output current detected by a current sensor.

SUMMARY

In accordance with an aspect of the present disclosure, there is provided an electric compressor that includes an electric motor, and a motor controller configured to drive the electric motor. The motor controller includes a high voltage circuit board on which switching elements are mounted, a low voltage circuit board on which a control circuit controlling switching operation of the switching elements is mounted, an input connector that provides electrical connection between the high voltage circuit board and the low voltage circuit board, and through which control signals from the control circuit are input into the switching elements, an output connector through which output current is output to the electric motor, and which is electrically connected to the high voltage circuit board, and a current sensor that is mounted on the high voltage circuit board, and detects the output current to the electric motor. The electric compressor is configured such that the high voltage circuit board and the low voltage circuit board are stacked with each other. The output connector is integrated with a detection bulbar that provides electrical connection between the high voltage circuit board and the low voltage circuit board, and through which detection signals indicative of the output current detected by the current sensor are output to the control circuit.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

The following will describe an electric compressor according to an embodiment of the present disclosure with reference to the accompanying drawings from FIG. 1 to FIG. 6. The electric compressor according to the present embodiment is, for example, used for a vehicle air conditioner.

Figure 1:
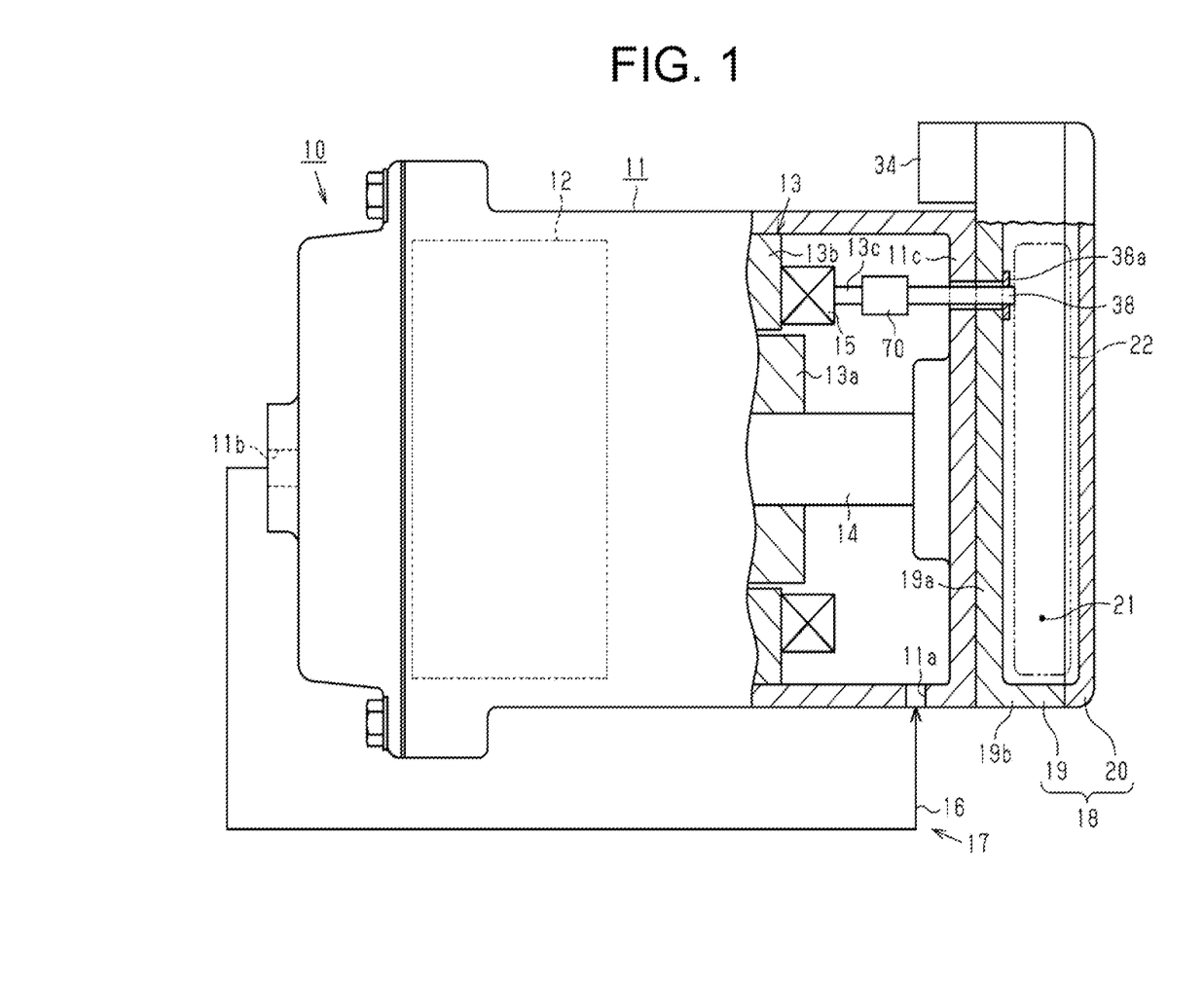
FIG. 1 is a cross-sectional view of an electric compressor according to an embodiment of the present disclosure.

As illustrated in FIG. 1, an electric compressor 10 includes a housing 11 in which a compression portion 12 configured to compress liquid refrigerant and an electric motor 13 configured to drive the compression portion 12 are accommodated. The compression portion 12 is a scroll type compression portion which includes, for example, a fixed scroll (not shown) fixed in the housing 11 and a movable scroll (not shown) disposed so as to face the fixed scroll.

An inlet port 11a and an outlet port 11b are formed through the housing 11. In addition, a rotary shaft 14 is accommodated in the housing 11. The rotary shaft 14 is rotatably supported by the housing 11. The electric motor 13 includes a rotor 13a that is fixed to the rotary shaft 14 and rotates integrally with the rotary shaft 14, and a stator 13b that is fixed to an inner peripheral surface of the housing 11 and surrounds the rotor 13a. A motor coil 15 is wound around each of teeth of the stator 13b. An electric power is supplied to the motor coil 15, by which the rotor 13a and the rotary shaft 14 rotates.

The inlet port 11a is connected to one end of an external refrigerant circuit 16. The outlet port 11b is connected to the other end of the external refrigerant circuit 16. Refrigerant is taken from the external refrigerant circuit 16 into the housing 11 through the inlet port 11a, and then, is compressed by the compression portion 12 in the housing 11. The compressed refrigerant is discharged to the external refrigerant circuit 16 through the outlet port 11b, flows through a heat exchanger and an expansion valve of the external refrigerant circuit 16, and returns to the housing 11 through the inlet port 11a. The electric compressor 10 and the external refrigerant circuit 16 cooperate to form a vehicle air conditioner 17.

The housing 11 includes a bottom wall 11c to which a case 18 is mounted. The case 18 has a case main body 19 that has a bottomed cylindrical shape and a cover portion 20 that has a bottomed cylindrical shape and is attachable to the case main body 19. The cover portion 20 closes an opening of the case main body 19. The case main body 19 and the cover portion 20 cooperate to form an accommodation chamber 21. A motor controller 22 configured to drive the electric motor 13 is accommodated in the accommodation chamber 21. That is, the motor controller 22 is accommodated in the case 18. The compression portion 12, the electric motor 13, and the motor controller 22 are arranged in this order in a rotational axis direction of the rotary shaft 14.

Figure 2:
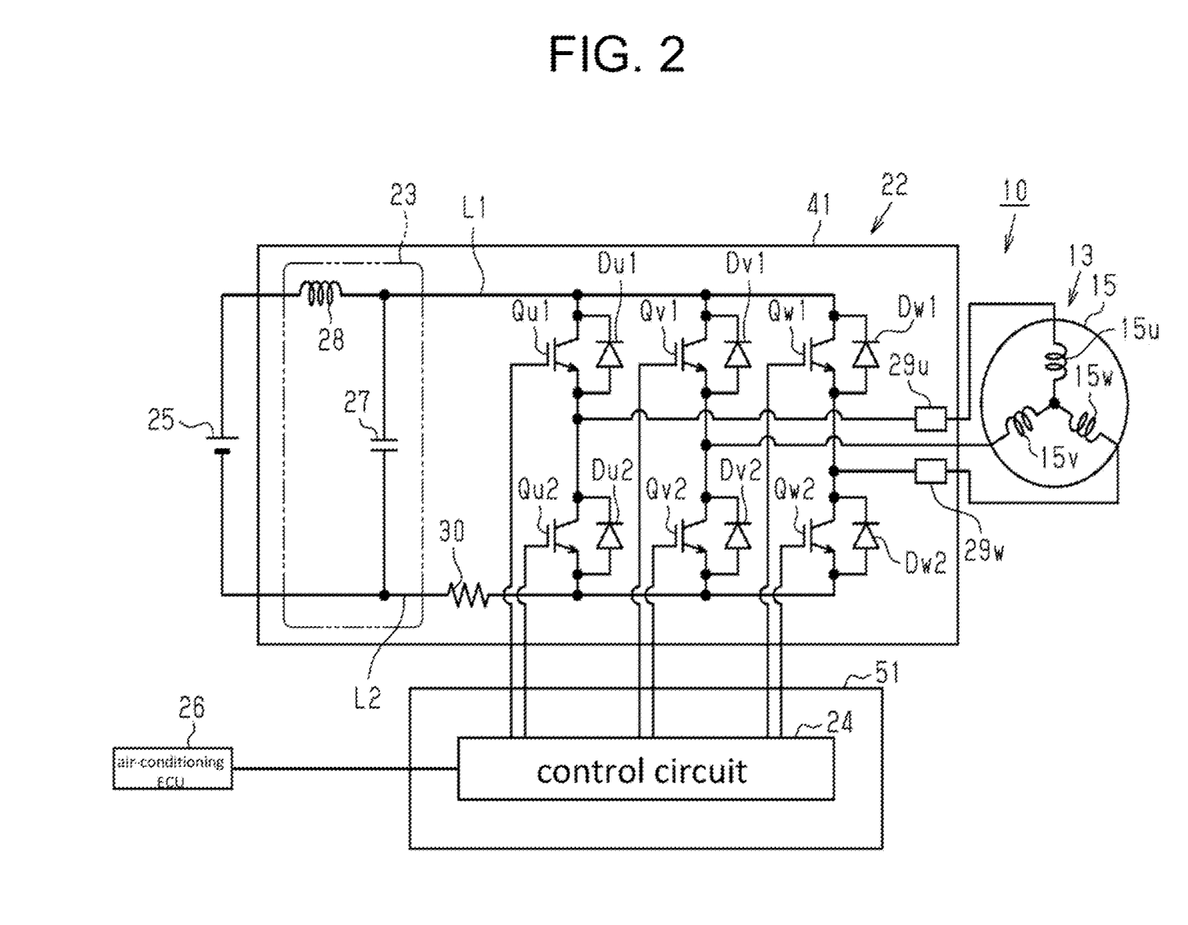
FIG. 2 is a circuit diagram showing an electrical structure of the electric compressor.

As illustrated in FIG. 2, the motor coil 15 of the electric motor 13 has a three-phase structure, and includes a u-phase coil 15u, a v-phase coil 15v, and w-phase coil 15w. In the present embodiment, the u-phase coil 15u, the v-phase coil 15v, and the w-phase coil 15w are Y-connected.

The motor controller 22 has a plurality of switching elements Qu1, Qu2, Qv1, Qv2, Qw1, and Qw2, and a filter circuit 23. The switching elements Qu1, Qu2, Qv1, Qv2, Qw1, and Qw2 perform switching operation so as to drive the electric motor 13. The switching elements Qu1, Qu2, Qv1, Qv2, Qw1, and Qw2 are insulated-bipolar transistors: IGBTs (power switching elements). The switching elements Qu1, Qu2, Qv1, Qv2, Qw1, and Qw2 are connected to diodes Du1, Du2, Dv1, Dv2, Dw1, and Dw2, respectively.

Each of pairs of the switching elements Qu1 and Qu2, Qv1 and Qv2, and Qw1 and Qw2 are serially connected. Gate terminals of the switching elements Qu1, Qu2, Qv1, Qv2, Qw1, and Qw2 are electrically connected to a control circuit 24. Collector terminals of the switching elements Qu1, Qv1, and Qw1 are electrically connected to a positive electrode of an external power source 25 via a positive electrode line L1. Emitter terminals of the switching elements Qu2, Qv2, and Qw2 are electrically connected to a negative electrode of the external power source 25 via a negative electrode line L2. Emitter terminals of the switching elements Qu1, Qv1, and Qw1 and the collector terminals of the switching elements Qu2, Qv2, and Qw2 are electrically connected to the u-phase coil 15u, the v-phase coil 15v, and the w-phase coil 15w via an intermediate point of the respective serial connections between the switching elements Qu1 and Qu2, between the switching elements Qv1 and Qv2, and between the switching elements Qw1 and Qw2.

The control circuit 24 controls drive voltage of the electric motor 13 by a pulse width modulation (PWM) control. Specifically, the control circuit 24 generates PWM signals by high-frequency triangular signals which are called carrier wave signals and voltage command signals for indicating the drive voltage. Then, the control circuit 24 controls on/off operation of the respective switching elements Qu1, Qu2, Qv1, Qv2, Qw1, and Qw2 by using the generated PWM signals. That is, the control circuit 24 controls switching operation of the respective switching elements Qu1, Qu2, Qv1, Qv2, Qw1, and Qw2. Thus, DC current from the external power source 25 is converted into AC current. The converted AC current is output to the electric motor 13 as the output current, by which the driving of the electric motor 13 is controlled.

In addition, the control circuit 24 variably controls a duty ratio between on and off times for each of the switching elements Qu1, Qu2, Qv1, Qv2, Qw1, and Qw2 by controlling the PWM signals. This controls a rotational speed of the electric motor 13. The control circuit 24 is electrically connected to an air-conditioning ECU 26, When receiving information of a target rotational speed of the electric motor 13 from the air-conditioning ECU 26, the control circuit 24 rotates the electric motor 13 at the target rotational speed.

The filter circuit 23 are disposed between the switching elements Qu1 Qu2, Qv1, Qv2, Qw1, and Qw2, and the external power source 25. The filter circuit 23 includes capacitors 27 and a coil 28. The capacitors 27 are electrically connected to the coil 28.

The motor controller 22 includes a u-phase current sensor 29u and a w-phase current sensor 29w that detect the output current to the electric motor 13. The current sensors 29u and 29w are configured of, for example, Hall elements. Specifically, the u-phase current sensor 29u detects the output current output to the u-phase coil 15u, and the w-phase current sensor 29w detects the output current output to the w-phase coil 15w. The output current herein refers to current that is output to the electric motor 13 from the motor controller 22 and flows through the electric motor 13. A total value of each output current output to the u-phase coil 15u, the v-phase coil 15v, and the w-phase coil 15w is 0. This means that the output current output to the v-phase coil 15v may be calculated in accordance with detection by the current sensors 29u and 29w.

The motor controller 22 further includes a shunt resistor 30. The shunt resistor 30 is disposed in the negative electrode line L2. Current flows through the shunt resistor 30, by which both ends of the shunt resistor 30 have a difference in electric potential. The control circuit 24 detects an input current input into the motor controller 22 from the external power source 25 based on the voltage between the both ends of the shunt resistor 30.

Figure 3:
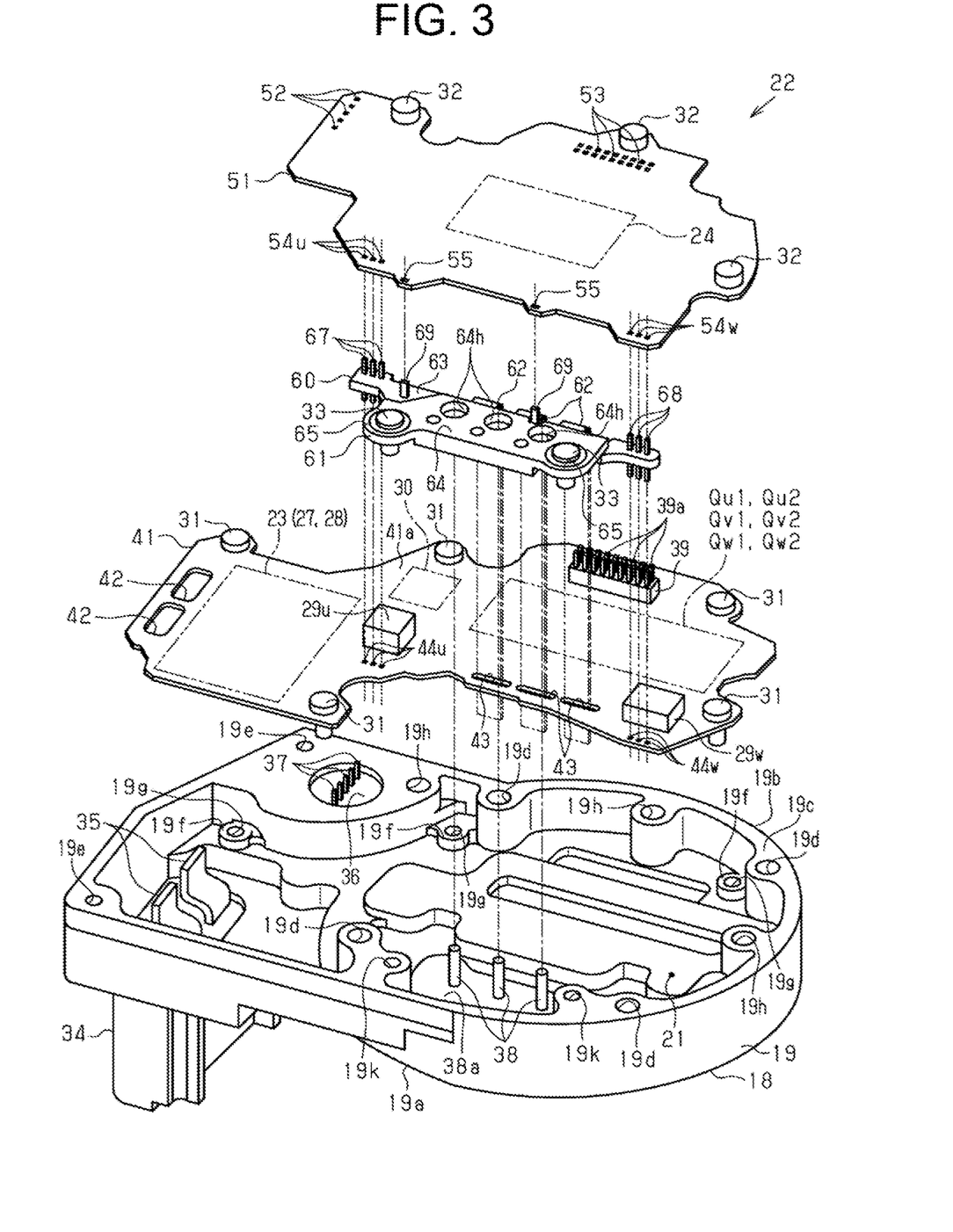
FIG. 3 is an exploded perspective view of a case main body and a motor controller.
Figure 4:
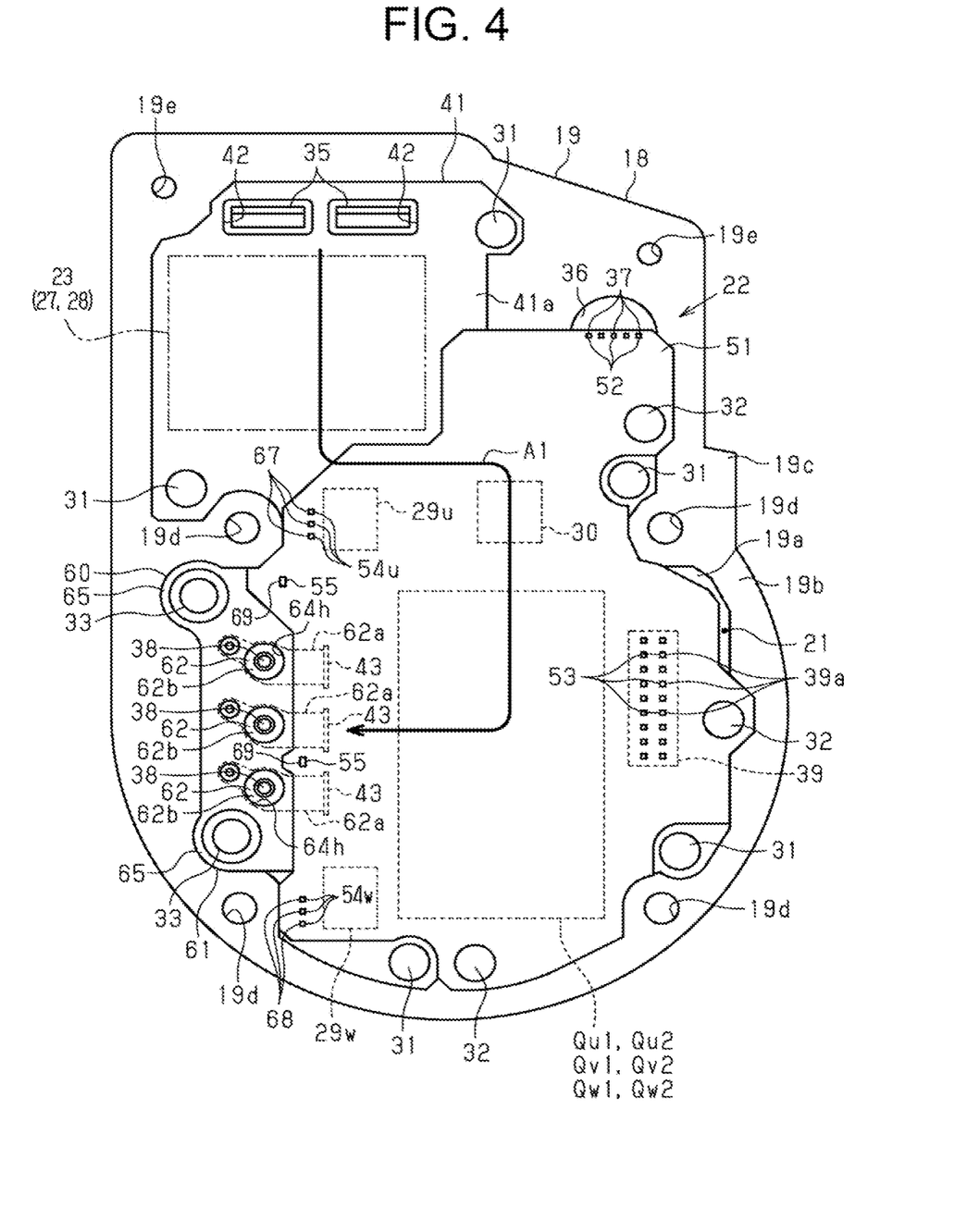
FIG. 4 is a plan view of the case main body and the motor controller.

As illustrated in FIGS. 3 and 4, the motor controller 22 includes a high voltage circuit board (HVCB) 41, a low voltage circuit board (LVCB) 51, and an output connector 60. The high voltage circuit board 41, the low voltage circuit board 51, and the output connector 60 are stacked in such a manner that the output connector 60 is sandwiched between the high voltage circuit board 41 and the low voltage circuit board 51, and mounted to the case main body 19. The high voltage circuit board 41 and the low voltage circuit board 51 are stacked with each other. The output connector 60 is electrically connected to the high voltage circuit board 41. The output current is output to the electric motor 13 through the output connector 60.

The case main body 19 has a case bottom wall 19a that has a plate-like shape and a peripheral wall 19b that extends from an outer peripheral portion of the case bottom wall 19a The peripheral wall 19b has an opening end face 19c that is located on the opposite side of the peripheral wall 19b relative to the case bottom wall 19a. The opening end face 19c has a plurality of bolt holes 19d into which bolts (not shown) for mounting the case main body 19 and the cover portion 20 to the housing 11 are inserted. The opening end face 19c of the peripheral wall 19b further has a plurality of first internal threaded holes 19e into which bolts (not shown) for mounting the cover portion 20 to the case main body 19 are screwed.

The case bottom wall 19a has a plurality of boss portions 19f. Surfaces of the boss portions 19f opposite the case bottom wall 19a are located closer to the case bottom wall 19a than the opening end face 19c of the peripheral wall 19b. Each of the boss portions 19f has a second internal threaded hole 19g into which a HVCB bolt 31 for mounting the high voltage circuit board 41 to the case main body 19 is screwed. The opening end face 19c of the peripheral wall 19b has a plurality of third internal threaded holes 19h into which LVCB bolts 32 for mounting the low voltage circuit board 51 to the case main body 19 are screwed. The opening end face 19c of the peripheral wall 19b further has a pair of fourth internal threaded holes 19k into which bolts 33 for mounting the output connector 60 to the case main body 19 are screwed.

A high voltage connector 34 that is connected to the external power source 25 is disposed in the case main body 19. The high voltage connector 34 has two input terminals 35 that provide electrical connection between the external power source 25 and the high voltage circuit board 41. A low voltage connector 36 that is connected to a low voltage power source (not shown) is also disposed in the case main body 19. The low voltage connector 36 has lead wires 37 that provide electrical connection between the low voltage power source and the low voltage circuit board 51. In addition, three conductive members 38 for outputting the output current to the electric motor 13 are disposed in the case main body 19. Three conductive members 38 are held by the case bottom wall 19a of the case main body 19 with a holding plate 38a interposed therebetween. Three conductive members 38 pass through the case bottom wall 19a.

As illustrated in FIG. 1, three conductive members 38 passing through the case bottom wall 19a of the case main body 19 protrude into the housing 11 through the bottom wall 11c of the housing 11. Three conductive members 38 are electrically connected to three motor electrical wires 13c drawn from the electric motor 13 with a cluster block 70, which is disposed in the housing 11, interposed between three conductive member 38 and the three motor electrical wires 13c.

As illustrated in FIGS. 3 and 4, the high voltage circuit board 41 is formed in a substantially rectangular flat plate-like shape. The switching elements Qu1, Qu2, Qv1, Qv2, Qw1, and Qw2, a plurality of capacitors 27, the coil 28, the current sensors 29u and 29w, and the shunt resistor 30 are mounted on one surface of the high voltage circuit board 41 in a thickness direction thereof. Accordingly, one surface of the high voltage circuit board 41 in the thickness direction thereof is a component side 41a on which the switching elements Qu1, Qu2, Qv1, Qv2, Qw1, and Qw2, the capacitors 27, the coil 28, the current sensors 29u and 29w, and the shunt resistor 30 are mounted.

The capacitors 27 are collected and disposed on a first end side of the high voltage circuit board 41 in a longitudinal direction thereof. The switching elements Qu1, Qu2, Qv1, Qv2, Qw1, and Qw2 are collected and disposed in a half region of the high voltage circuit board 41 on a second end side of the high voltage circuit board 41 in the longitudinal direction thereof. The coil 28 and the shunt resistor 30 are disposed near the region where the capacitors 27 are collected on the high voltage circuit board 41.

The high voltage circuit board 41 has two input terminal holes 42 through which the input terminals 35 of the high voltage connector 34 are inserted. The input terminal holes 42 are located closer to one end of the high voltage circuit board 41 in the longitudinal direction thereof than the region where the capacitors 27 are collected on the high voltage circuit board 41. The input terminals 35 are inserted into the input terminal holes 42, by which the input terminals 35 and the high voltage circuit board 41 are electrically connected.

The u-phase current sensor 29u is disposed between the region where the capacitors 27 are collected in the longitudinal direction of the high voltage circuit board 41 and the region where the switching elements Qu1, Qu2, Qv1, Qv2, Qw1, and Qw2 are collected, and closer to a first end of the high voltage circuit board 41 in a short direction thereof. The w-phase current sensor 29w is disposed on a second end portion of the high voltage circuit board 41 in the longitudinal direction thereof and closer to the first end of the high voltage circuit board 41 in the short direction thereof. The w-phase current sensor 29w is disposed closer to the first end of the high voltage circuit board 41 in the short direction thereof than the region where the switching elements Qu1, Qu2, Qv1, Qv2, Qw1, and Qw2 are collected. The two current sensors 29u and 29w face each other in the longitudinal direction of the high voltage circuit board 41. Thus, the current sensors 29u and 29w are mounted on the high voltage circuit board 41.

The motor controller 22 includes an input connector 39 that provides electrical connection between the high voltage circuit board 41 and the low voltage circuit board 51. The input connector 39 is mounted on the high voltage circuit board 41. The input connector 39 is disposed on the second end portion of the high voltage circuit board 41 in the longitudinal direction thereof and closer to a second end of the high voltage circuit board 41 in the short direction thereof. The input connector 39 is disposed closer to the second end of the high voltage circuit board 41 in the short direction thereof than the region where the switching elements Qu1, Qu2, Qv1, Qv2, Qw1, and Qw2 are collected. The input connector 39 has a plurality of terminals 39a which are electrically connected to the low voltage circuit board 51.

The control circuit 24 is mounted on the low voltage circuit board 51. The low voltage circuit board 51 has lead holes 52 through which the lead wires 37 of the low voltage connector 36 are inserted. The lead wires 37 of the low voltage connector 36 inserted through the lead holes 52 are soldered to the low voltage circuit board 51, by which the low voltage connector 36 is electrically connected to the low voltage circuit board 51.

The low voltage circuit board 51 has a plurality of LVCB terminal holes 53 through which the terminals 39a of the input connector 39 are inserted. The terminals 39a of the input connector 39 inserted through the LVCB terminal holes 53 are soldered to the low voltage circuit board 51, by which the input connector 39 is electrically connected to the low voltage circuit board 51. Control signals from the control circuit 24 are input into the switching elements Qu1, Qu2, Qv1, Qv2, Qw1, and Qw2 through the input connector 39.

Figure 5:
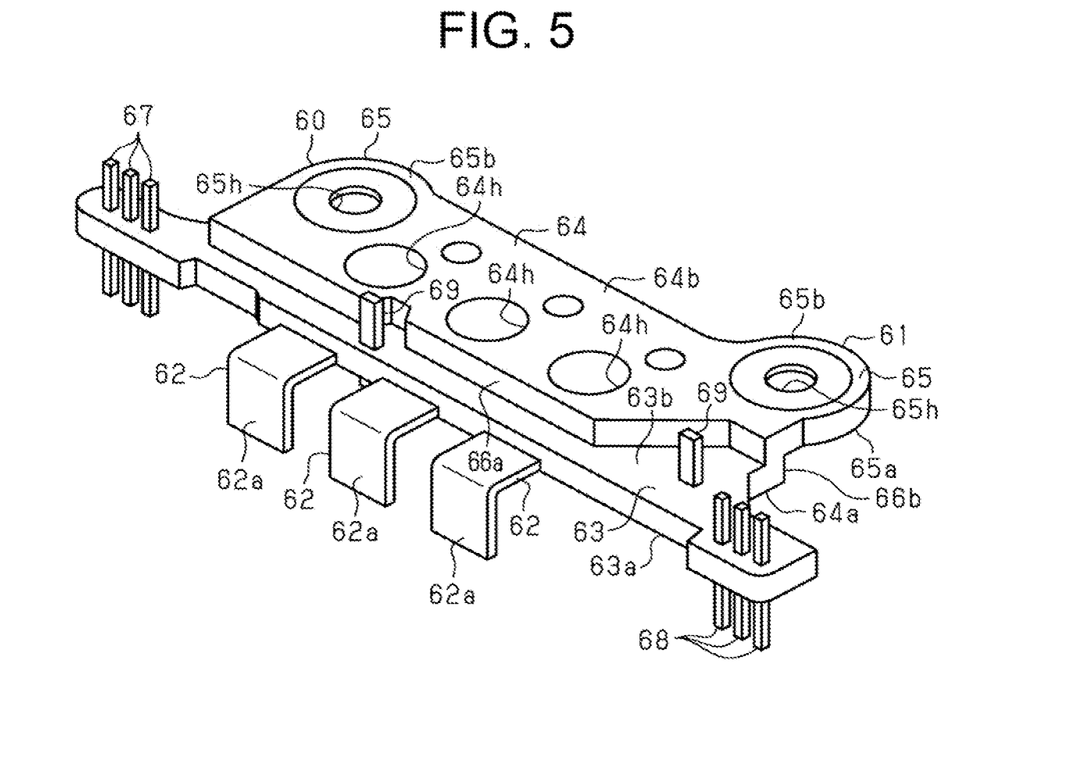
FIG. 5 is a perspective view of an output connector.
Figure 6:
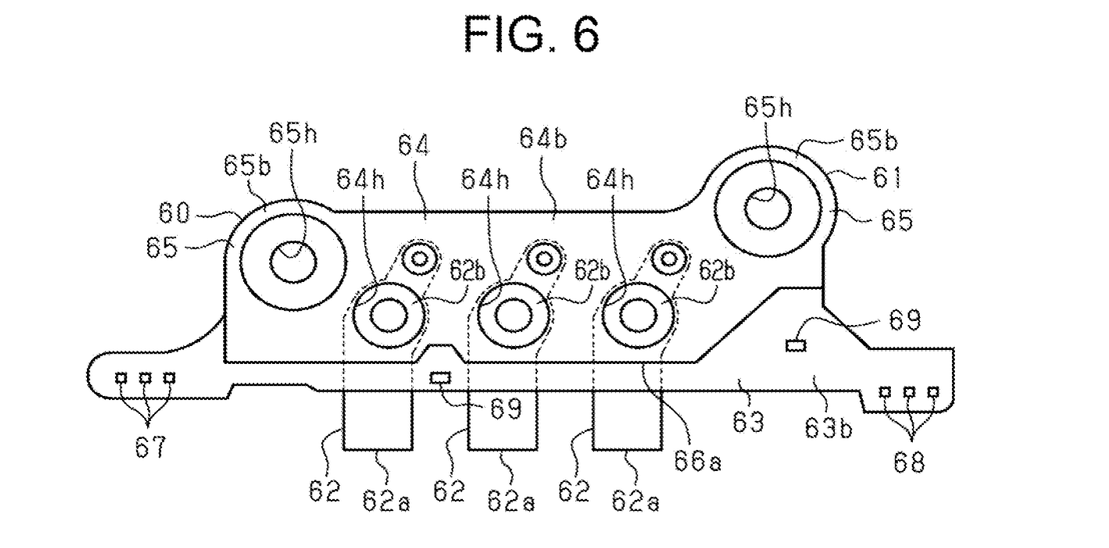
FIG. 6 is a plan view of the output connector.

As illustrated in FIGS. 5 and 6, the output connector 60 has a resin main body 61 that is formed in a plate-like shape and three connecting terminals 62. The resin main body 61 has a thin plate portion 63, a thick plate portion 64, and a pair of attachment plate portions 65. One surface of the thin plate portion 63 in a thickness direction thereof refers to a first facing surface 63a that faces the high voltage circuit board 41. The other surface of the thin plate portion 63 in the thickness direction thereof refers to a second facing surface 63b that faces the low voltage circuit board 51.

A thickness direction of the thick plate portion 64 is the same as the thickness direction of the thin plate portion 63. A thickness of the thick plate portion 64 is thicker than that of the thin plate portion 63. A first thick plate surface 64a which is one surface of the thick plate portion 64 in the thickness direction thereof is located on the same surface as the first facing surface 63a, and extends continuously to the first facing surface 63a. A second thick plate surface 64b which is the other surface of the thick plate portion 64 in the thickness direction thereof extends continuously to the second facing surface 63b via a first step surface 66a substantially perpendicular to the second thick plate surface 64b and the second facing surface 63b.

A thickness of each of the attachment plate portions 65 is thinner than that of the thin plate portion 63. A first attachment plate surface 65a which is one surface of the attachment plate portion 65 in a thickness direction thereof extends continuously to the first thick plate surface 64a via a second step surface 66b substantially perpendicular to the first attachment plate surface 65a and the first thick plate surface 64a. A second attachment plate surface 65b which is the other surface of the attachment plate portion 65 in the thickness direction thereof is located on the same surface as the second thick plate surface 64b of the thick plate portion 64, and extends continuously to the second thick plate surface 64b. The first attachment plate surfaces 65a of the attachment plate portions 65 are located on the same surface. The attachment plate portions 65 have output connector bolt holes 65h through which the bolts 33 are inserted.

The output connector 60 has three connecting terminals 62 that are integrated with the resin main body 61 by insert molding. Accordingly, the motor controller 22 includes the output connector 60 with which three connecting terminal 62 are integrated.

Each of the connecting terminals 62 has a first connecting portion 62a that is a narrow plate portion bent in an L-shape, and a second connecting portion 62b that has a circular shape and extends continuously to one end portion of the first connecting portion 62a. A portion of the first connecting portion 62a opposite the second connecting portion 62b protrudes from the thin plate portion 63 of the resin main body 61 and extends perpendicular to a protruding direction from the thin plate portion 63 so as to bend in the L-shape. An end portion of the first connecting portion 62a on a side of the second connecting portion 62b is embedded in the thick plate portion 64 of the resin main body 61. The second connecting portion 62b is embedded in the thick plate portion 64 of the resin main body 61 in a state that a central axis of the second connecting portion 62b extends along the thickness direction of the thick plate portion 64 of the resin main body 61.

The thick plate portion 64 of the resin main body 61 has three through holes 64h that pass through the resin main body 61 in a thickness direction thereof. A central axis of each of the through holes 64h is the same as the central axis of the corresponding connecting terminal 62. One second connecting portion 62b is partially exposed to the air radially inside the through hole 64h as viewed from sides of the first thick plate surface 64a and the second thick plate surface 64b of the thick plate portion 64 of the resin main body 61. Each of the conductive members 38 may be inserted through the second connecting portion 62b of the connecting terminal 62. The connecting terminals 62 are electrically connected to the conductive members 38 by inserting the conductive members 38 through the second connecting portions 62b.

As illustrated in FIGS. 3 and 4, the high voltage circuit board 41 has HVCB terminal holes 43 through which end portions of the first connecting portions 62a of the connecting terminals 62 opposite the second connecting portions 62b are inserted. The HVCB terminal holes 43 are disposed on the second end portion of the high voltage circuit board 41 in the longitudinal direction thereof and closer to the first end of the high voltage circuit board 41 in the short direction thereof. The HVCB terminal holes 43 are disposed closer to the first end of the high voltage circuit board 41 in the short direction thereof than the region where the switching elements Qu1, Qu2, Qv1, Qv2, Qw1, and Qw2 are collected. The HVCB terminal holes 43 are disposed on the opposite side of the region where the switching elements Qu1, Qu2, Qv1, Qv2, Qw1, and Qw2 are collected relative to the input connector 39 in the short direction of the high voltage circuit board 41. The HVCB terminal holes 43 and the input connector 39 are disposed across the region where the switching elements Qu1, Qu2, Qv1, Qv2, Qw1, and Qw2 are collected in the short direction of the high voltage circuit board 41. The HVCB terminal holes 43 are arranged in a line in the longitudinal direction of the high voltage circuit board 41. The HVCB terminal holes 43 are disposed between two current sensors 29u and 29w in the longitudinal direction of the high voltage circuit board 41.

End portions of the first connecting portions 62a of the connecting terminals 62 opposite the second connecting portions 62b are inserted through the HVCB terminal holes 43, by which the connecting terminals 62 are electrically connected to the high voltage circuit board 41. With this configuration, the connecting terminals 62 provide electrical connection between the conductive members 38 and the high voltage circuit board 41.

As illustrated in FIGS. 5 and 6, the output connector 60 has first detection busbars 67 and second detection busbars 68 as the detection busbars. The first detection busbars 67 and the second detection busbars 68 pass through the thin plate portion 63 of the resin main body 61 in the thickness direction thereof, and are integrated with the thin plate portion 63 of the resin main body 61. One end portions of the first detection busbars 67 and one end portions of the second detection busbars 68 are protruded from the first facing surface 63a of the thin plate portion 63. The other end portions of the first detection busbars 67 and the other end portions of the second detection busbars 68 are protruded from the second facing surface 63b of the thin plate portion 63. The first detection busbars 67 and the second detection busbars 68 are integrated with the thin plate portion 63 of the resin main body 61 by insert molding. Accordingly, the first detection busbars 67 and the second detection busbars 68 are integrated with the output connector 60.

As illustrated in FIGS. 3 and 4, the high voltage circuit board 41 has first busbar HVCB holes 44u through which one end portions of the first detection busbars 67 are inserted. The first busbar HVCB holes 44*u* are disposed near the u-phase current sensor 29*u* on the high voltage circuit board 41, and closer to the first end of the high voltage circuit board 41 in the short direction thereof than the u-phase current sensor 29*u*. One end portions of the first detection busbars 67 inserted through the first busbar HVCB holes 44*u* are soldered to the high voltage circuit board 41, by which the first detection busbars 67 are electrically connected to the high voltage circuit board 41. The first detection busbars 67 and the u-phase current sensor 29*u* are electrically connected via a trace of the high voltage circuit board 41.

The high voltage circuit board 41 has second busbar HVCB holes 44*w* through which one end portions of the second detection busbars 68 are inserted. The second busbar HVCB holes 44*w* are disposed near the w-phase current sensor 29*w* on the high voltage circuit board 41, and closer to the first end of the high voltage circuit board 41 in the short direction thereof than the w-phase current sensor 29*w*. One end portions of the second detection busbars 68 inserted through the second busbar HVCB holes 44*w* are soldered to the high voltage circuit board 41, by which the second detection busbars 68 are electrically connected to the high voltage circuit board 41. The second detection busbars 68 and the w-phase current sensor 29*w* are electrically connected via a trace of the high voltage circuit board 41.

As shown in FIGS. 5 and 6, the output connector 60 has two holding busbars 69 that hold the low voltage circuit board 51 as the holding members. The holding busbars 69 are made of metal. The holding busbars 69 are integrated with the thin plate portion 63, and protruded in the thickness direction of the thin plate portion 63 from the second facing surface 63*b* of the thin plate portion 63 of the resin main body 61. The holding busbars 69 are integrated with the thin plate portion 63 of the resin main body 61 by insert molding. Accordingly, the holding busbars 69 made of metal are integrated with the output connector 60.

As illustrated in FIGS. 3 and 4, the low voltage circuit board 51 has first busbar LVCB holes 54*u* through which the other end portions of the first detection busbars 67 are inserted. The other end portions of the first detection busbars 67 inserted through the first busbar LVCB holes 54*u* are soldered to the low voltage circuit board, by which the first detection busbars 67 are electrically connected to the low voltage circuit board 51. With this configuration, the first detection busbars 67 provide electrical connection between the high voltage circuit board 41 and the low voltage circuit board 51, Detection signals indicative of the output current detected by u-phase current sensor 29*u* are output to the control circuit 24 through the first detection busbars 67.

The low voltage circuit board 51 has second busbar LVCB holes 54*w* through which the other end portions of the second detection busbars 68 are inserted. The other end portions of the second detection busbars 68 inserted through the second busbar LVCB holes 54*w* are soldered to the low voltage circuit board 51, by which the second detection busbars 68 are electrically connected to the low voltage circuit board 51. With this configuration, the second detection busbars 68 provide electrical connection between the high voltage circuit board 41 and the low voltage circuit board 51. Detection signals indicative of the output current detected by w-phase current sensor 29*w* are output to the control circuit 24 through the second detection busbars 68.

The low voltage circuit board 51 has holding busbar holes 55 through which the holding busbars 69 are inserted. The holding busbars 69 inserted through the holding busbar holes 55 are soldered to the low voltage circuit board 51, by which the holding busbars 69 are connected to the low voltage circuit board 51. Accordingly, the holding busbars 69 passes through the low voltage circuit board 51, and are soldered to the low voltage circuit board 51. The holding busbars 69 soldered to the low voltage circuit board 51 are not electrically connected to a trace of the low voltage circuit board 51. That is, current does not flow through the holding busbars 69.

Next, a process in which the high voltage circuit board 41, the low voltage circuit board 51, and the output connector 60 are mounted to the case main body 19 will be described.

Firstly, the HVCB bolts 31 passing through an outer peripheral portion of the high voltage circuit board 41 are screwed into the second internal threaded holes 19*g* of the boss portions 19*f*, by which the high voltage circuit board 41 are mounted to the case main body 19. Then, the input terminals 35 are inserted into the input terminal holes 42, thereby providing electrical connection between the input terminals 35 and the high voltage circuit board 41, so that the external power source 25 and the high voltage circuit board 41 are electrically connected with each other via the input terminals 35.

Next, the output connector 60 is disposed relative to the case main body 19 in such a manner that the attachment plate portions 65 are brought into contact with peripheral portions of the fourth internal threaded holes 19*k* on the opening end face 19*c* of the peripheral wall 19*b*, and the first facing surface 63*a* of the thin plate portion 63 of the resin main body 61 faces the high voltage circuit board 41. Then, the bolts 33 passing through the output connector bolt holes 65*h* of the attachment plate portions 65 are screwed into the fourth internal threaded holes 19*k*, by which the output connector 60 is mounted to the case main body 19.

Here, the conductive members 38 are inserted through the second connecting portions 62*b* of the connecting terminals 62 through the through holes 64*h*, by which the conductive members 38 and the connecting terminals 62 are electrically connected with each other. In addition, the end portions of the first connecting portions 62*a* of the connecting terminals 62 opposite the second connecting portions 62*b* are inserted through the HVCB terminal holes 43 of the high voltage circuit board 41, by which the connecting terminals 62 and the high voltage circuit board 41 are electrically connected with each other.

Furthermore, one end portions of the first detection busbars 67 are inserted through the first busbar HVCB holes 44*u*, and soldered to the high voltage circuit board 41, by which the first detection busbars 67 and the high voltage circuit board 41 are electrically connected with each other. One end portions of the second detection busbars 68 are inserted through the second busbar HVCB holes 44*w*, and soldered to the high voltage circuit board 41, by which the second detection busbars 68 and the high voltage circuit board 41 are electrically connected with each other.

Furthermore, the low voltage circuit board 51 is disposed relative to the second facing surface 63*b* of the thin plate portion 63 of the resin main body 61 in such a manner that the other end portions of the first detection busbars 67, the other end portions of the second detection busbars 68, and the holding busbars 69 are inserted into the first busbar LVCB holes 54*u*, the second busbar LVCB holes 54*w*, and the holding busbar holes 55, respectively. Then, the first detection busbars 67 are soldered to the low voltage circuit board 51, by which the first detection busbars 67 and the low voltage circuit board 51 are electrically connected with each other. The second detection busbars 68 are also soldered to the low voltage circuit board 51, by which the second detection busbars 68 and the low voltage circuit board 51 are electrically connected with each other. The holding busbars 69 are also soldered to the low voltage circuit board 51, by which the holding busbars 69 are connected to the low voltage circuit board 51, so that the low voltage circuit board 51 are held by the output connector 60 via the holding busbars 69.

In addition, the lead wires 37 of the low voltage connector 36 are inserted through the lead holes 52, by which the low voltage connector 36 and the low voltage circuit board 51 are electrically connected with each other. The terminals 39a of the input connector 39 are inserted into the LVCB terminal holes 53, by which the input connector 39 and the low voltage circuit board 51 are electrically connected with each other. Then, the LVCB bolts 32 passing through an outer peripheral portion of the low voltage circuit board 51 are screwed into the third internal threaded holes 19h, by which the low voltage circuit board 51 are mounted to the case main body 19.

The following will describe an operation according to the present embodiment.

As illustrated by an arrow A1 in FIG. 4, current from the external power source 25 flows into a trace of the high voltage circuit board 41 through the input terminals 35, and then input into the switching elements Qu1, Qu2, Qv1, Qv2, Qw1, and Qw2 via the filter circuit 23 as the DC current. The switching elements Qu1 Qu2, Qv1, Qv2, Qw1, and Qw2 perform the switching operation in accordance with the control signals input into the high voltage circuit board 41 from the control circuit 24 through the input connector 39, thereby converting the DC current to AC current. The converted AC current is output to the electric motor 13 through the connecting terminals 62, the conductive members 38, the cluster block 70, and the motor electrical wires 13c as the output current. This drives the electric motor 13. The compression portion 12 is driven by a rotation of the rotary shaft 14 along with the driving of the electric motor 13, so that refrigerant is compressed by the compression portion 12. It is noted that the arrow A1 illustrated in FIG. 4 shows a current path along which the current flows from the input terminals 35 into the connecting terminals 62 on the high voltage circuit board 41.

The current sensors 29u and 29w detects the output current. The detection signals indicative of the output current detected by the current sensors 29u and 29w are output to the control circuit 24 of the low voltage circuit board 51 through the first detection busbars 67 and the second detection busbars 68. Then, the control circuit 24 controls the switching operation of the switching elements Qu1, Qu2, Qv1, Qv2, Qw1, and Qw2 so that the output current detected by the current sensors 29u and 29w reach the required current.

A case in which, for example, the detection signals indicative of the output current detected by the current sensors 29u and 29w are output to the control circuit 24 of the low voltage circuit board 51 through the input connector 39 is herein considered. In this case, traces need not be extended from the current sensors 29u and 29w on the high voltage circuit board 41. Accordingly, it is avoided that the detection signals indicative of the output current detected by the current sensors 29u and 29w may be affected by noise from the switching elements Qu1, Qu2, Qv1, Qv2, Qw1, and Qw2, and the traces crosses the current path formed on the high voltage circuit board 41.

The following advantageous effects are obtained according to the above embodiment.

(1) The first detection busbars 67 and the second detection busbars 68 which provide electrical connection between the high voltage circuit board 41 and the low voltage circuit board 51, and through which the detection signals indicative of the output current detected by the current sensors 29u and 29w are output to the control circuit 24 are integrated with the output connector 60 being a conventional configuration. With this configuration of the present embodiment, a detection connector for outputting to the control circuit 24 the detection signals indicative of the output current detected by the current sensors 29u and 29w need not be separately provided. In addition, for example, as a case in which the detection signals indicative of the output current detected by the current sensors 29u and 29w are output to the control circuit 24 of the low voltage circuit board 51 with use of the input connector 39 by extending the traces from the current sensors 29u and 29w, the traces need not be extended on the high voltage circuit board 41. Accordingly, it is avoided that the detection signals indicative of the output current detected by the current sensors 29u and 29w may be affected by noise from the switching elements Qu1, Qu2, Qv1, Qv2, Qw1, and Qw2, and the traces crosses the current path formed on the high voltage circuit board 41. As described above, the present disclosure restrains a size of the electric compressor 10 from being increased, and noise of the current flowing in the high voltage circuit board 41 from affecting the detection signals indicative of the output current detected by the current sensors 29u and 29w.

(2) The holding busbars 69 which are made of metal and hold the low voltage circuit board 51 are integrated with the output connector 60. The holding busbars 69 pass through the low voltage circuit board 51, and are soldered to the low voltage circuit board 51. With this configuration, the low voltage circuit board 51 are held by the output connector 60 via the holding busbars 69, so that vibration resistance of the low voltage circuit board 51 may be improved.

(3) The bolts 33 passing through the output connector bolt holes 65h of the attachment plate portions 65 are screwed into the fourth internal threaded holes 19k, by which the output connector 60 is mounted to the case main body 19. With this configuration, accuracy of the positioning of the output connector 60 relative to the case main body 19 may be improved.

(4) In the configuration as the present embodiment in which at least two current sensors 29u, 29w are required to detect the output currents output to the u-phase coil 15u, v-phase coil 15v, and w-phase coil 15w, it is difficult to integrate a plurality of detection connectors and a plurality of input connectors 39 corresponding to these current sensors 29u and 29w with each other. Accordingly, the advantageous effect of the present embodiment in which a size of the electric compressor 10 is restrained from being increased is more remarkable.

It is noted that the above embodiment may be modified as follows. The above embodiments and the following modifications may be appropriately combined with each other, as long as there is no technical contradictions.

In the embodiment, the number of the holding busbars 69 are not limited in particular. The number of the holding busbars 69 may be one or three or more.

In the embodiment, the output connector 60 may not be integrated with the holding busbars 69.

In the embodiment, the motor controller 22 may further include a current sensor that detects output current output to the v-phase coil 15v. In this configuration, the output connector 60 is further integrated with detection busbars which provide electrical connection between the current sensor that detects the output current output to the v-phase coil 15*v* and the low voltage circuit board 51. In addition, the motor controller 22 may include only one current sensor that detects output current to one coil of the u-phase coil 15*u*, the v-phase coil 15*v*, and the w-phase coil 15*w*.

In the embodiment, the resin main body 61 of the output connector 60 may have a uniform thickness and may not have the thin plate portion 63 and the thick plate portion 64.

In the embodiment, the switching elements Qu1, Qu2, Qv1, Qv2, Qw1, and Qw2 are IGBTs. However, the switching elements Qu1, Qu2, Qv1, Qv2, Qw1, and Qw2 are not limited to the IGBTs, and may be other power semiconductor devices such as MOSFETs.

In the embodiment, the electric compressor 10 may have a configuration in which the motor controller 22 are disposed outward of the housing 11 in a radial direction of the rotary shaft 14. This means that the compression portion 12, the electric motor 13, and the motor controller 22 may not be arranged in this order in the rotational axis direction of the rotary shaft 14.

In the embodiment, the compression portion 12 is not limited to a scroll type compression portion. For example, the compression portion 12 may be of a piston type and a vane type.

In the embodiment, the electric compressor 10 forms the vehicle air conditioner 17. However, the electric compressor 10 is not limited to this configuration, and may be mounted on a fuel cell vehicle and compress air as fluid supplied to fuel cells by the compression portion 12.

What is claimed is:

1. An electric compressor, comprising:
   an electric motor;
   a compression portion driven by the electric motor and configured to compress refrigerant, and
   a motor controller configured to drive the electric motor, the motor controller including:
     a high voltage circuit board on which switching elements are mounted;
     a low voltage circuit board on which a control circuit controlling switching operation of the switching elements is mounted;
     an input connector that provides electrical connection between the high voltage circuit board and the low voltage circuit board, and through which control signals from the control circuit are input into the switching elements;
     an output connector through which output current is output to the electric motor, and which is electrically connected to the high voltage circuit board; and
     two current sensors that are mounted on the high voltage circuit board, and are configured to detect the output current output from the output connector to the electric motor,
   the electric compressor being configured such that the high voltage circuit board and the low voltage circuit board are stacked with each other, wherein
   the output connector is integrated with first detection busbars and second detection busbars that provide electrical connection between the high voltage circuit board and the low voltage circuit board, and through which detection signals indicative of the output current detected by the two current sensors are output to the control circuit,
   the output connector has a resin main body that is formed in a plate-like shape, and further has a thin plate portion and a thick plate portion, and the thick plate portion is thicker than the thin plate portion,
   a first facing surface of the thin plate portion in a thickness direction thereof faces the high voltage circuit board, and a second facing surface of the thin plate portion in the thickness direction thereof faces the low voltage circuit board,
   a first thick plate surface of the thick plate portion in a thickness direction thereof extends continuously to the first facing surface, and a second thick plate surface of the thick plate portion in the thickness direction thereof extends continuously to the second facing surface via a first step surface,
   the low voltage circuit board is disposed relative to the second facing surface of the thin plate portion,
   the first detection busbars and the second detection busbars pass through the thin plate portion of the resin main body in the thickness direction thereof, and are integrated with the thin plate portion of the resin main body, wherein first end portions of the first detection busbars and first end portions of the second detection busbars are protruded from the first facing surface of the thin plate portion, and second end portions of the first detection busbars and second end portions of the second detection busbars are protruded from the second facing surface of the thin plate portion,
   the low voltage circuit board has first busbar low voltage circuit board (LVCB) holes through which the second end portions of the first detection busbars are inserted, and the second end portions of the first detection busbars inserted through the first busbar LVCB holes are soldered to the low voltage circuit board,
   the low voltage circuit board has second busbar LVCB holes through which the second end portions of the second detection busbars are inserted, and the second end portions of the second detection busbars inserted through the second busbar LVCB holes are soldered to the low voltage circuit board, the high voltage circuit board has first busbar high voltage circuit board (HVCB) holes through which the first end portions of the first detection busbars are inserted, and the first busbar HVCB holes are disposed near one of the two current sensors on the high voltage circuit board, and the first end portions of the first detection busbars inserted through the first busbar HVCB holes are soldered to the high voltage circuit board, and
   the high voltage circuit board has second busbar HVCB holes through which the first end portions of the second detection busbars are inserted, and the second busbar HVCB holes are disposed near the other of the two current sensors on the high voltage circuit board, and the first end portions of the second detection busbars inserted through the second busbar HVCB holes are soldered to the high voltage circuit board.

2. The electric compressor according to claim 1, wherein a holding busbar that is made of metal and holds the low voltage circuit board is integrated with the output connector, and
the holding busbar passes through the low voltage circuit board, and is soldered to the low voltage circuit board.

* * * * *